(12) United States Patent
Eibl

(10) Patent No.: US 12,076,788 B2
(45) Date of Patent: Sep. 3, 2024

(54) POWDER FEEDSTOCK FOR WEAR RESISTANT BULK WELDING CONFIGURED TO OPTIMIZE MANUFACTURABILITY

(71) Applicant: Oerlikon Metco (US) Inc., Westbury, NY (US)

(72) Inventor: Cameron Jacob Eibl, Encinitas, CA (US)

(73) Assignee: Oerlikon Metco (US) Inc., Westbury, NY (US)

( * ) Notice: Subject to any disclaimer, the term of this patent is extended or adjusted under 35 U.S.C. 154(b) by 0 days.

(21) Appl. No.: 17/607,563

(22) PCT Filed: May 3, 2020

(86) PCT No.: PCT/US2020/031043
§ 371 (c)(1),
(2) Date: Oct. 29, 2021

(87) PCT Pub. No.: WO2020/227099
PCT Pub. Date: Nov. 12, 2020

(65) Prior Publication Data
US 2022/0219231 A1 Jul. 14, 2022

Related U.S. Application Data

(60) Provisional application No. 62/842,867, filed on May 3, 2019.

(51) Int. Cl.
| C22C 30/00 | (2006.01) |
| B22F 1/00 | (2022.01) |
| B22F 1/12 | (2022.01) |
| C22C 32/00 | (2006.01) |

(52) U.S. Cl.
CPC .................. *B22F 1/12* (2022.01); *B22F 1/09* (2022.01); *C22C 30/00* (2013.01); *C22C 32/0047* (2013.01); *B22F 2301/35* (2013.01); *B22F 2302/05* (2013.01); *B22F 2302/10* (2013.01)

(58) Field of Classification Search
CPC ....................................................... C22C 30/00
See application file for complete search history.

(56) References Cited

U.S. PATENT DOCUMENTS

| 2,043,952 A | 6/1936 | Ffield |
| 2,156,306 A | 5/1939 | Rapatz |
| 2,507,195 A | 5/1950 | Winearls |
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Buckingham et al. |
| 3,554,792 A | 1/1971 | Johnson |
| 3,650,734 A | 3/1972 | Kantor et al. |
| 3,663,214 A | 5/1972 | Moore |
| 3,724,016 A | 4/1973 | Kumar et al. |
| 3,819,364 A | 6/1974 | Frehn |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Peterson |
| 4,017,339 A | 4/1977 | Okuda et al. |
| 4,042,383 A | 8/1977 | Petersen et al. |
| 4,066,451 A | 1/1978 | Rudy |
| 4,110,514 A | 8/1978 | Nicholson |
| 4,214,145 A | 7/1980 | Zvanut et al. |
| 4,235,630 A | 11/1980 | Babu |
| 4,240,827 A | 12/1980 | Aihara |
| 4,255,709 A | 3/1981 | Zatsepium et al. |
| 4,277,108 A | 7/1981 | Wallace |
| 4,285,725 A | 8/1981 | Gysel |
| 4,297,135 A | 10/1981 | Giessen et al. |
| 4,318,733 A | 3/1982 | Ray et al. |
| 4,362,553 A | 12/1982 | Ray |
| 4,365,994 A | 12/1982 | Ray |
| 4,415,530 A | 11/1983 | Hunt |
| 4,419,130 A | 12/1983 | Slaughter |
| 4,576,653 A | 3/1986 | Ray |
| 4,596,282 A | 6/1986 | Maddy et al. |
| 4,606,977 A | 8/1986 | Dickson et al. |
| 4,635,701 A | 1/1987 | Sare et al. |
| 4,638,847 A | 1/1987 | Day |
| 4,639,576 A | 1/1987 | Shoemaker et al. |
| 4,666,797 A | 5/1987 | Newman et al. |
| 4,673,550 A | 6/1987 | Dallaire et al. |
| 4,762,681 A | 8/1988 | Tassen et al. |
| 4,803,045 A | 2/1989 | Ohriner et al. |
| 4,806,394 A | 2/1989 | Steine |
| 4,818,307 A | 4/1989 | Mori et al. |
| 4,822,415 A | 4/1989 | Dorfman et al. |
| 4,888,153 A | 12/1989 | Yabuki |
| 4,919,728 A | 4/1990 | Kohl et al. |

(Continued)

FOREIGN PATENT DOCUMENTS

| CN | 86102537 | 9/1987 |
| CN | 1033292 | 6/1989 |

(Continued)

OTHER PUBLICATIONS

Al-Aqeeli et al.: "Formation of an amorphous phase and its crystallization in the immiscible Nb—Zr system by mechanical alloying," Journal of Applied Physics 114, 153512, 2013.

(Continued)

*Primary Examiner* — Christopher S Kessler
(74) *Attorney, Agent, or Firm* — KNOBBE, MARTENS, OLSON & BEAR, LLP

(57) ABSTRACT

Disclosed herein are embodiments of a powder feedstock, such as for bulk welding, which can produce welds. The powder feedstock can include high levels of boron, and may be improved over previously used cored wires. Coatings can be formed from the powder feedstock which may have high hardness in certain embodiments, and low mass loss under ASTM standards.

9 Claims, 3 Drawing Sheets

(56) References Cited

U.S. PATENT DOCUMENTS

| | | |
|---|---|---|
| 4,943,488 A | 7/1990 | Sung et al. |
| 4,957,982 A | 9/1990 | Geddes |
| 4,966,626 A | 10/1990 | Fujiki et al. |
| 4,981,644 A | 1/1991 | Chang |
| 5,094,812 A | 3/1992 | Dulmaine et al. |
| 5,252,149 A | 10/1993 | Dolman |
| 5,280,726 A | 1/1994 | Urbanic et al. |
| 5,306,358 A | 4/1994 | Lai et al. |
| 5,375,759 A | 12/1994 | Hiraishi et al. |
| 5,424,101 A | 6/1995 | Atkins |
| 5,495,837 A | 3/1996 | Mitsuhashi |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,837,326 A | 11/1998 | Dallaire |
| 5,843,243 A | 12/1998 | Kawasaki et al. |
| 5,858,558 A | 1/1999 | Zhao et al. |
| 5,861,605 A | 1/1999 | Ogawa et al. |
| 5,907,017 A | 5/1999 | Ober et al. |
| 5,911,949 A | 6/1999 | Ninomiya et al. |
| 5,935,350 A | 8/1999 | Raghu et al. |
| 5,942,289 A | 8/1999 | Jackson |
| 5,976,704 A | 11/1999 | McCune |
| 5,988,302 A | 11/1999 | Sreshta et al. |
| 6,071,324 A | 6/2000 | Laul et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,238,843 B1 | 5/2001 | Ray |
| 6,306,524 B1 | 10/2001 | Spitsberg et al. |
| 6,326,582 B1 | 12/2001 | North |
| 6,331,688 B1 | 12/2001 | Hallén et al. |
| 6,332,936 B1 | 12/2001 | Hajaligo et al. |
| 6,375,895 B1 | 4/2002 | Daemen |
| 6,398,103 B2 | 6/2002 | Hasz et al. |
| 6,441,334 B1 | 8/2002 | Aida et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,507,305 B2 | 3/2009 | Kawasaki et al. |
| 7,553,382 B2 | 6/2009 | Branagan et al. |
| 7,569,286 B2 | 8/2009 | Daemen et al. |
| 7,754,152 B2 | 7/2010 | Riebel et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,662,143 B1 | 3/2014 | Foster |
| 8,669,491 B2 | 3/2014 | Menon et al. |
| 8,702,835 B2 | 4/2014 | Yu et al. |
| 8,703,046 B2 | 4/2014 | Hanejko et al. |
| 8,704,134 B2 | 4/2014 | Branagan et al. |
| 8,777,090 B2 | 7/2014 | Miller et al. |
| 8,801,872 B2 | 8/2014 | Wright et al. |
| 8,808,471 B2 | 8/2014 | Wright et al. |
| 8,858,675 B2 | 10/2014 | Larsson |
| 8,870,997 B2 | 10/2014 | Klekovkin et al. |
| 8,901,022 B2 | 12/2014 | Francy et al. |
| 8,911,662 B2 | 12/2014 | Larsson |
| 8,920,938 B2 | 12/2014 | Hesse et al. |
| 8,961,869 B2 | 2/2015 | Kapoor et al. |
| 8,973,806 B2 | 3/2015 | Cheney |
| 8,992,659 B2 | 3/2015 | Larsson et al. |
| 9,051,635 B2 | 6/2015 | Jou |
| 9,095,932 B2 | 8/2015 | Miller et al. |
| 9,145,598 B2 | 9/2015 | Oshchepkov |
| 9,174,293 B2 | 11/2015 | Meyer |
| 9,193,011 B2 | 11/2015 | Mars et al. |
| 9,233,419 B2 | 1/2016 | Gries |
| 9,255,309 B2 | 2/2016 | Aimone |
| 9,309,585 B2 | 4/2016 | Cheney et al. |
| 9,314,848 B2 | 4/2016 | Larsson |
| 9,340,855 B2 | 5/2016 | Schade et al. |
| 9,394,591 B2 | 7/2016 | Deodeshmukh et al. |
| 9,399,907 B2 | 7/2016 | Mo et al. |
| 9,469,890 B2 | 10/2016 | Bengtsson |
| 9,540,711 B2 | 1/2017 | Fifield |
| 9,580,773 B2 | 2/2017 | Aimone et al. |
| 9,631,262 B2 | 4/2017 | Wright et al. |
| 9,724,786 B2 | 8/2017 | Postle et al. |
| 9,725,793 B2 | 8/2017 | Aimone et al. |
| 9,738,959 B2 | 8/2017 | Cheney et al. |
| 9,745,648 B2 | 8/2017 | Olserius et al. |
| 9,802,387 B2 | 10/2017 | Cheney |
| 9,815,148 B2 | 11/2017 | Postle |
| 9,816,164 B2 | 11/2017 | Larsson et al. |
| 9,821,372 B2 | 11/2017 | Gries |
| 9,834,829 B1 | 12/2017 | Aimone et al. |
| 9,845,520 B2 | 12/2017 | Wright et al. |
| 9,856,546 B2 | 1/2018 | Fischer et al. |
| 9,869,132 B2 | 1/2018 | Wyble et al. |
| 9,879,333 B2 | 1/2018 | Gerk et al. |
| 9,908,816 B2 | 3/2018 | Champion et al. |
| 9,914,987 B2 | 3/2018 | Snyder et al. |
| 9,919,358 B2 | 3/2018 | Gries |
| 9,951,413 B2 | 4/2018 | Billieres |
| 9,957,590 B2 | 5/2018 | Mars et al. |
| 9,957,592 B2 | 5/2018 | Aimone et al. |
| 9,970,091 B2 | 5/2018 | Crook et al. |
| 9,994,935 B2 | 6/2018 | Wolverton et al. |
| 10,100,388 B2 | 10/2018 | Cheney |
| 10,105,796 B2 | 10/2018 | Eibl |
| 10,125,412 B2 | 11/2018 | Kaner et al. |
| 10,173,290 B2 | 1/2019 | Cheney |
| 10,252,919 B2 | 4/2019 | Billieres et al. |
| 10,329,647 B2 | 6/2019 | Cheney |
| RE47,529 E | 7/2019 | Johnson |
| 10,351,921 B2 | 7/2019 | Snyder et al. |
| 10,351,922 B2 | 7/2019 | Snyder et al. |
| 10,351,938 B2 | 7/2019 | Schade et al. |
| 10,358,699 B2 | 7/2019 | Srivastava et al. |
| 10,358,701 B2 | 7/2019 | Reed et al. |
| 10,370,740 B2 | 8/2019 | Reed et al. |
| 10,384,313 B2 | 8/2019 | Persson |
| 10,400,314 B2 | 9/2019 | Aimone et al. |
| 10,458,006 B2 | 10/2019 | Bengtsson |
| 10,465,267 B2 | 11/2019 | Cheney |
| 10,465,268 B2 | 11/2019 | Bergman |
| 10,465,269 B2 | 11/2019 | Cheney |
| 10,471,503 B2 | 11/2019 | Wright et al. |
| 10,513,758 B2 | 12/2019 | Mars |
| 10,519,529 B2 | 12/2019 | Wright et al. |
| 10,550,460 B2 | 2/2020 | Nilsson et al. |
| 10,577,680 B2 | 3/2020 | Srivastava et al. |
| 10,597,757 B2 | 3/2020 | Gong et al. |
| 10,702,918 B2 | 7/2020 | Hu |
| 10,702,924 B2 | 7/2020 | Szabo et al. |
| 10,711,329 B2 | 7/2020 | Wright et al. |
| 10,731,236 B2 | 8/2020 | Kaner et al. |
| 10,745,782 B2 | 8/2020 | Wolverton et al. |
| 10,851,444 B2 | 12/2020 | Vecchio et al. |
| 10,851,565 B1 | 12/2020 | Krueger |
| 10,872,682 B2 | 12/2020 | Reed et al. |

(56) References Cited

U.S. PATENT DOCUMENTS

| | | |
|---|---|---|
| 10,934,608 B2 | 3/2021 | Gu |
| 10,941,473 B2 | 3/2021 | Snyder |
| 10,954,588 B2 | 3/2021 | Cheney |
| 11,001,912 B2 | 5/2021 | Aimone et al. |
| 11,033,998 B2 | 6/2021 | Kavanaugh et al. |
| 11,085,102 B2 | 8/2021 | Cheney |
| 11,111,912 B2 | 9/2021 | Cheney |
| 11,114,226 B2 | 9/2021 | Jayaraman et al. |
| 11,118,247 B2 | 9/2021 | Gong et al. |
| 11,124,429 B2 | 9/2021 | Gore et al. |
| 11,130,205 B2 | 9/2021 | Cheney |
| 11,174,538 B2 | 11/2021 | Kaner et al. |
| 2001/0019781 A1 | 9/2001 | Hasz |
| 2002/0054972 A1 | 5/2002 | Charpentier et al. |
| 2002/0060907 A1 | 5/2002 | Saccomanno |
| 2002/0098298 A1 | 7/2002 | Bolton et al. |
| 2002/0148533 A1 | 10/2002 | Kim et al. |
| 2002/0159914 A1 | 10/2002 | Yeh |
| 2003/0013171 A1 | 1/2003 | Yang et al. |
| 2004/0001966 A1 | 1/2004 | Subramanian |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0047952 A1 | 3/2005 | Coleman |
| 2005/0109431 A1 | 5/2005 | Kernan et al. |
| 2005/0139294 A1 | 6/2005 | Kim et al. |
| 2005/0164016 A1 | 7/2005 | Branagan et al. |
| 2006/0063020 A1 | 3/2006 | Barbezat |
| 2006/0093752 A1 | 5/2006 | Darolia et al. |
| 2006/0163217 A1 | 7/2006 | Jiang |
| 2006/0191606 A1 | 8/2006 | Ogawa et al. |
| 2006/0260583 A1 | 11/2006 | Abi-Akar et al. |
| 2007/0026159 A1 | 2/2007 | Deem |
| 2007/0029295 A1 | 2/2007 | Branagan |
| 2007/0090167 A1 | 4/2007 | Arjakine et al. |
| 2007/0125458 A1 | 6/2007 | Kawasaki et al. |
| 2007/0187369 A1 | 8/2007 | Menon et al. |
| 2007/0219053 A1 | 9/2007 | Barufka et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0083391 A1 | 4/2008 | Sawada |
| 2008/0149397 A1 | 6/2008 | Overstreet |
| 2008/0241580 A1 | 10/2008 | Kiser et al. |
| 2008/0241584 A1 | 10/2008 | Daemen et al. |
| 2008/0246523 A1 | 10/2008 | Murakamo et al. |
| 2008/0253918 A1 | 10/2008 | Liang |
| 2009/0017328 A1 | 1/2009 | Katoh et al. |
| 2009/0075057 A1 | 3/2009 | Kulkarni |
| 2009/0123765 A1 | 5/2009 | Branagan |
| 2009/0154183 A1 | 6/2009 | Nagai et al. |
| 2009/0252636 A1 | 10/2009 | Christopherson, Jr. et al. |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0028706 A1 | 2/2010 | Hornschu et al. |
| 2010/0044348 A1 | 2/2010 | Buchmann |
| 2010/0047622 A1 | 2/2010 | Fischer et al. |
| 2010/0055495 A1 | 3/2010 | Sjodin |
| 2010/0101780 A1 | 4/2010 | Ballew et al. |
| 2010/0132408 A1 | 6/2010 | Billieres |
| 2010/0136361 A1 | 6/2010 | Osuki et al. |
| 2010/0155236 A1 | 6/2010 | Lee et al. |
| 2010/0159136 A1 | 6/2010 | Lee et al. |
| 2010/0166594 A1 | 7/2010 | Hirata et al. |
| 2010/0189588 A1 | 7/2010 | Kawatsu et al. |
| 2010/0192476 A1 | 8/2010 | Theisen et al. |
| 2010/0258217 A1 | 10/2010 | Kuehmann |
| 2011/0004069 A1 | 1/2011 | Ochs et al. |
| 2011/0031222 A1 | 2/2011 | Branagan et al. |
| 2011/0048587 A1 | 3/2011 | Vecchio et al. |
| 2011/0064963 A1 | 3/2011 | Cheney et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055899 A1 | 3/2012 | Parmaningsih |
| 2012/0055903 A1 | 3/2012 | Izutani et al. |
| 2012/0100390 A1 | 4/2012 | Kuroda |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0258273 A1 | 10/2012 | Churchill et al. |
| 2012/0288400 A1 | 11/2012 | Hirata et al. |
| 2013/0039800 A1 | 2/2013 | Dolman |
| 2013/0094900 A1 | 4/2013 | Folkmann et al. |
| 2013/0108502 A1 | 5/2013 | Bei |
| 2013/0167965 A1 | 7/2013 | Cheney et al. |
| 2013/0171367 A1 | 7/2013 | Kusinski et al. |
| 2013/0174612 A1 | 7/2013 | Linnot et al. |
| 2013/0216722 A1 | 8/2013 | Kusinski et al. |
| 2013/0220523 A1 | 8/2013 | Cheney |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0266820 A1 | 10/2013 | Kusinski et al. |
| 2013/0294962 A1 | 11/2013 | Wallin et al. |
| 2014/0024509 A1 | 1/2014 | Gerschefske |
| 2014/0044587 A1 | 2/2014 | Crook et al. |
| 2014/0044617 A1 | 2/2014 | Dreisinger |
| 2014/0060707 A1 | 3/2014 | Wright et al. |
| 2014/0066851 A1 | 3/2014 | Cheney, II |
| 2014/0116575 A1 | 5/2014 | Cheney et al. |
| 2014/0131338 A1 | 5/2014 | Postle |
| 2014/0190594 A1 | 7/2014 | Branagan et al. |
| 2014/0219859 A1 | 8/2014 | Cheney |
| 2014/0234154 A1 | 8/2014 | Cheney et al. |
| 2014/0248509 A1 | 9/2014 | Cheney et al. |
| 2014/0263248 A1 | 9/2014 | Postle |
| 2014/0272388 A1 | 9/2014 | Knight et al. |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0114525 A1 | 4/2015 | Valls Anglés |
| 2015/0118098 A1 | 4/2015 | Valls |
| 2015/0122552 A1 | 5/2015 | Wang et al. |
| 2015/0152994 A1 | 6/2015 | Bondil et al. |
| 2015/0252631 A1 | 9/2015 | Miller |
| 2015/0275341 A1 | 10/2015 | Cheney |
| 2015/0284817 A1 | 10/2015 | Snyder et al. |
| 2015/0284829 A1 | 10/2015 | Cheney |
| 2015/0307968 A1 | 10/2015 | Mars et al. |
| 2015/0328680 A1 | 11/2015 | Tuffile |
| 2015/0367454 A1 | 12/2015 | Cheney |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0138144 A1 | 5/2016 | Olsérius |
| 2016/0144463 A1 | 5/2016 | Hellsten et al. |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0271736 A1 | 9/2016 | Han et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0329139 A1 | 11/2016 | Jayaraman |

(56) References Cited

U.S. PATENT DOCUMENTS

| | | |
|---|---|---|
| 2016/0376686 A1 | 12/2016 | Jou |
| 2017/0009324 A1 | 1/2017 | Crook et al. |
| 2017/0014865 A1 | 1/2017 | Kusinski et al. |
| 2017/0022588 A1 | 1/2017 | Tang et al. |
| 2017/0044646 A1 | 2/2017 | Gong et al. |
| 2017/0145547 A1 | 5/2017 | Saal et al. |
| 2017/0253950 A1 | 9/2017 | Shinohara |
| 2017/0275740 A1 | 9/2017 | Bergman |
| 2017/0275748 A1 | 9/2017 | Cheney et al. |
| 2018/0016664 A1 | 1/2018 | Hu |
| 2018/0021894 A1 | 1/2018 | Persoon et al. |
| 2018/0066343 A1 | 3/2018 | Bengtsson |
| 2018/0066345 A1 | 3/2018 | Cheney et al. |
| 2018/0094343 A1 | 4/2018 | Gerk et al. |
| 2018/0099877 A1 | 4/2018 | Chang et al. |
| 2018/0135143 A1 | 5/2018 | Snyder et al. |
| 2018/0195156 A1 | 7/2018 | Reed et al. |
| 2018/0216212 A1 | 8/2018 | Reed et al. |
| 2018/0230016 A1 | 8/2018 | Kaner et al. |
| 2018/0230578 A1 | 8/2018 | Srivastava et al. |
| 2018/0245190 A1 | 8/2018 | Snyder et al. |
| 2018/0265949 A1 | 9/2018 | Wolverton et al. |
| 2018/0272423 A1 | 9/2018 | Hu |
| 2019/0017154 A1 | 1/2019 | Kaner et al. |
| 2019/0024217 A1 | 1/2019 | Yolton |
| 2019/0071318 A1 | 3/2019 | Kaner et al. |
| 2019/0084039 A1 | 3/2019 | Hu |
| 2019/0135646 A1 | 5/2019 | Turner et al. |
| 2019/0160603 A1 | 5/2019 | Eibl |
| 2019/0177820 A1 | 6/2019 | Larsson |
| 2019/0300374 A1 | 10/2019 | Shevchenko et al. |
| 2019/0309399 A1 | 10/2019 | Badwe |
| 2019/0323107 A1 | 10/2019 | Srivastava et al. |
| 2019/0368014 A1 | 12/2019 | Liimatainen |
| 2019/0376165 A1 | 12/2019 | Wen |
| 2020/0001367 A1 | 1/2020 | Duffy et al. |
| 2020/0005975 A1 | 1/2020 | Jayaraman et al. |
| 2020/0048743 A1 | 2/2020 | Gong et al. |
| 2020/0063238 A1 | 2/2020 | Yolton |
| 2020/0063239 A1 | 2/2020 | Xu et al. |
| 2020/0078860 A1 | 3/2020 | Wright et al. |
| 2020/0109465 A1 | 4/2020 | Cao et al. |
| 2020/0149141 A1 | 5/2020 | Wu et al. |
| 2020/0172998 A1 | 6/2020 | Crudden et al. |
| 2020/0189918 A1 | 6/2020 | Saeuberlich et al. |
| 2020/0223007 A1 | 7/2020 | Keegan et al. |
| 2020/0308679 A1 | 10/2020 | Nymann |
| 2020/0316718 A1 | 10/2020 | Smathers |
| 2020/0325561 A1 | 10/2020 | Kaner |
| 2020/0370149 A1 | 11/2020 | Gong |
| 2020/0385845 A1 | 12/2020 | Gong |
| 2021/0040585 A1 | 2/2021 | Alabort |
| 2021/0046543 A1 | 2/2021 | Larsson |
| 2021/0062305 A1 | 3/2021 | Fang |
| 2021/0147967 A1 | 5/2021 | Cao et al. |
| 2021/0164081 A1 | 6/2021 | Eibl |
| 2021/0180157 A1 | 6/2021 | Bracci |
| 2021/0180162 A1 | 6/2021 | Vecchio |
| 2021/0180170 A1 | 6/2021 | Pike |
| 2021/0197524 A1 | 7/2021 | Maroli et al. |
| 2021/0222275 A1 | 7/2021 | Saboo et al. |
| 2021/0246537 A1 | 8/2021 | Maroli et al. |
| 2021/0254202 A1 | 8/2021 | Gong et al. |
| 2021/0262050 A1 | 8/2021 | Oshchepkov et al. |
| 2021/0286079 A1 | 9/2021 | Vecchio |
| 2021/0310106 A1 | 10/2021 | Wei et al. |
| 2021/0324498 A1 | 10/2021 | Hericher et al. |
| 2021/0332465 A1 | 10/2021 | Behera et al. |
| 2021/0387920 A1 | 12/2021 | Bouttes et al. |

FOREIGN PATENT DOCUMENTS

| | | |
|---|---|---|
| CN | 1225629 C | 11/2005 |
| CN | 101016603 | 8/2007 |
| CN | 101994076 | 3/2011 |
| CN | 102233490 A | 11/2011 |
| CN | 102286702 | 12/2011 |
| CN | 102357750 A | 2/2012 |
| CN | 103628017 | 3/2014 |
| CN | 104093510 | 10/2014 |
| CN | 104625473 | 5/2015 |
| CN | 104694840 | 6/2015 |
| CN | 104805391 | 7/2015 |
| CN | 108607983 | 10/2018 |
| DE | 27 54 437 | 7/1979 |
| DE | 33 20 513 | 12/1983 |
| DE | 42 02 828 | 8/1993 |
| DE | 4411296 | 7/1995 |
| DE | 10 320 397 A1 | 12/2004 |
| DE | 10329912 | 6/2005 |
| EP | 0 346 293 | 12/1989 |
| EP | 0 365 884 | 5/1990 |
| EP | 0 774 528 | 5/1997 |
| EP | 0 740 591 | 3/1999 |
| EP | 0 939 139 | 10/2001 |
| EP | 1 270 755 | 1/2003 |
| EP | 1 279 748 | 1/2003 |
| EP | 1 279 749 | 1/2003 |
| EP | 1 120 472 | 7/2003 |
| EP | 1 361 288 | 9/2006 |
| EP | 1 721 999 | 11/2006 |
| EP | 1 857 204 | 11/2007 |
| EP | 1 694 876 | 1/2008 |
| EP | 2 050 533 | 4/2009 |
| EP | 2 305 415 | 4/2011 |
| EP | 2 388 345 | 11/2011 |
| EP | 2 628 825 | 8/2013 |
| EP | 2 639 323 | 9/2013 |
| EP | 2 660 342 | 11/2013 |
| EP | 2 072 627 | 4/2014 |
| EP | 2 730 355 | 5/2014 |
| EP | 2 743 361 | 6/2014 |
| EP | 2 104 753 | 7/2014 |
| EP | 2 777 869 | 9/2014 |
| EP | 2 778 247 | 9/2014 |
| EP | 2 873 747 | 5/2015 |
| EP | 2 563 942 | 10/2015 |
| EP | 2 064 359 | 4/2016 |
| EP | 3 034 211 | 6/2016 |
| EP | 2 235 225 | 10/2016 |
| EP | 3 093 858 | 11/2016 |
| EP | 2 659 014 | 4/2017 |
| EP | 3 156 155 | 4/2017 |
| EP | 2 147 445 | 5/2017 |
| EP | 2 252 419 | 6/2017 |
| EP | 2 265 559 | 6/2017 |
| EP | 2 329 507 | 6/2017 |
| EP | 2 285 996 | 8/2017 |
| EP | 3 211 108 | 8/2017 |
| EP | 1 700 319 | 10/2017 |
| EP | 2 207 907 | 12/2017 |
| EP | 2 788 136 | 1/2018 |
| EP | 2 414 554 B1 | 2/2018 |
| EP | 3 145 660 | 4/2018 |
| EP | 2 432 908 B1 | 5/2018 |
| EP | 2 181 199 | 8/2018 |
| EP | 2 477 784 | 8/2018 |
| EP | 2 695 171 | 8/2018 |
| EP | 3 354 758 | 8/2018 |
| EP | 1 799 380 | 9/2018 |
| EP | 3 034 637 B1 | 10/2018 |
| EP | 3 266 892 | 10/2018 |
| EP | 3 444 452 | 2/2019 |
| EP | 2 265 739 | 6/2019 |
| EP | 3 259 095 | 6/2019 |
| EP | 1 844 172 | 7/2019 |
| EP | 3 517 642 | 7/2019 |
| EP | 3 115 472 | 10/2019 |
| EP | 2 155 921 | 11/2019 |
| EP | 3 350 354 | 2/2020 |
| EP | 3 354 764 | 3/2020 |
| EP | 3 149 216 | 4/2020 |
| EP | 2 403 966 B1 | 5/2020 |
| EP | 3 362 210 | 5/2020 |

(56) References Cited

FOREIGN PATENT DOCUMENTS

| | | |
|---|---|---|
| EP | 3 134 558 | 7/2020 |
| EP | 3 514 253 | 10/2020 |
| EP | 3 333 275 | 11/2020 |
| EP | 3 653 736 | 12/2020 |
| EP | 3 411 169 | 1/2021 |
| EP | 3 590 642 | 1/2021 |
| EP | 3 590 643 | 1/2021 |
| EP | 1 848 836 B1 | 4/2021 |
| EP | 3 822 007 | 5/2021 |
| EP | 2 671 669 | 6/2021 |
| FR | 2055735 | 4/1971 |
| FR | 2218797 | 9/1974 |
| GB | 465999 | 5/1937 |
| GB | 956740 | 4/1964 |
| GB | 1073621 | 6/1967 |
| GB | 2153846 A | 8/1985 |
| GB | 2273109 | 6/1994 |
| GB | 2579580 | 7/2020 |
| GB | 2567492 | 9/2020 |
| GB | 2584654 | 12/2020 |
| GB | 2584905 | 12/2020 |
| IN | MUMNP-2003-00842 | 4/2005 |
| JP | 43-019745 | 8/1968 |
| JP | 45-026214 | 10/1970 |
| JP | 47-1685 | 1/1972 |
| JP | 49-056839 | 6/1974 |
| JP | 58-132393 | 8/1983 |
| JP | 59-016952 | 1/1984 |
| JP | 60-133996 | 7/1985 |
| JP | 6031897 B1 | 7/1985 |
| JP | 61-283489 | 12/1986 |
| JP | 63-026205 | 2/1988 |
| JP | 63-42357 | 2/1988 |
| JP | 63-65056 | 3/1988 |
| JP | 63-089643 | 4/1988 |
| JP | 03-133593 | 6/1991 |
| JP | 03-248799 | 11/1991 |
| JP | 04-237592 | 8/1992 |
| JP | 04-358046 | 12/1992 |
| JP | 07-179997 | 7/1995 |
| JP | 07-268524 | 10/1995 |
| JP | 08-134570 | 5/1996 |
| JP | 09-95755 | 4/1997 |
| JP | 2001-066130 | 3/2001 |
| JP | 2001-303233 | 10/2001 |
| JP | 2002-241919 | 8/2002 |
| JP | 2003-205352 | 7/2003 |
| JP | 2004-149924 | 5/2004 |
| JP | 2005-042152 | 2/2005 |
| JP | 2005-290406 | 10/2005 |
| JP | 2007-154284 | 6/2007 |
| JP | 2008-261329 | 10/2008 |
| JP | 2010-138440 | 6/2010 |
| JP | 2010-138491 | 6/2010 |
| JP | 2012-000616 | 1/2012 |
| JP | 2015-083715 | 4/2015 |
| JP | 2015-526596 | 9/2015 |
| KR | 10-0935816 B1 | 1/2010 |
| SU | 1706398 | 1/1992 |
| TW | 200806801 A | 2/2008 |
| WO | WO 84/000385 | 2/1984 |
| WO | WO 84/004760 | 12/1984 |
| WO | WO 95/004628 | 2/1995 |
| WO | WO 03/018856 | 3/2003 |
| WO | WO 06/080978 | 8/2006 |
| WO | WO 06/086350 | 8/2006 |
| WO | WO 07/120194 | 10/2007 |
| WO | WO 08/042330 | 4/2008 |
| WO | WO 08/060226 | 5/2008 |
| WO | WO 08/082353 | 7/2008 |
| WO | WO 08/105788 | 9/2008 |
| WO | WO 08/153499 | 12/2008 |
| WO | WO 09/085000 | 7/2009 |
| WO | WO 10/044740 | 4/2010 |
| WO | WO 10/046224 | 4/2010 |
| WO | WO 10/074634 | 7/2010 |
| WO | WO 10/134886 | 11/2010 |
| WO | WO 11/005403 | 1/2011 |
| WO | WO 11/021751 | 2/2011 |
| WO | WO 11/071054 | 6/2011 |
| WO | WO 11/084213 | 7/2011 |
| WO | WO 11/091479 | 8/2011 |
| WO | WO 11/152774 | 12/2011 |
| WO | WO 11/158706 | 12/2011 |
| WO | WO 12/021186 | 2/2012 |
| WO | WO 12/022874 | 2/2012 |
| WO | WO 12/112844 | 8/2012 |
| WO | WO 12/162226 | 11/2012 |
| WO | WO 13/049056 | 4/2013 |
| WO | WO 13/055652 | 4/2013 |
| WO | WO 13/060839 | 5/2013 |
| WO | WO 13/102650 | 7/2013 |
| WO | WO 13/126134 | 8/2013 |
| WO | WO 13/152306 | 10/2013 |
| WO | WO 13/167580 | 11/2013 |
| WO | WO 13/167628 | 11/2013 |
| WO | WO 13/185174 | 12/2013 |
| WO | WO 14/001544 | 1/2014 |
| WO | WO 14/023646 | 2/2014 |
| WO | WO 14/070006 | 5/2014 |
| WO | WO 14/081491 | 5/2014 |
| WO | WO 14/083544 | 6/2014 |
| WO | WO 14/085319 | 6/2014 |
| WO | WO 14/090922 | 6/2014 |
| WO | WO 14/114714 | 7/2014 |
| WO | WO 14/114715 | 7/2014 |
| WO | WO 14/187867 | 11/2014 |
| WO | WO 14/197088 | 12/2014 |
| WO | WO 14/201239 | 12/2014 |
| WO | WO 14/202488 | 12/2014 |
| WO | WO 15/028358 | 3/2015 |
| WO | WO 15/049309 | 4/2015 |
| WO | WO 15/075122 | 5/2015 |
| WO | WO 15/183955 | 12/2015 |
| WO | WO 16/003520 | 1/2016 |
| WO | WO 16/010599 | 1/2016 |
| WO | WO 16/041977 | 3/2016 |
| WO | WO 16/099390 | 6/2016 |
| WO | WO 16/124532 | 8/2016 |
| WO | WO 16/131702 | 8/2016 |
| WO | WO 17/041006 | 3/2017 |
| WO | WO 17/046517 | 3/2017 |
| WO | WO 17/059026 | 4/2017 |
| WO | WO 17/063923 | 4/2017 |
| WO | WO 17/091743 | 6/2017 |
| WO | WO 17/132286 | 8/2017 |
| WO | WO 17/132322 | 8/2017 |
| WO | WO 17/134039 | 8/2017 |
| WO | WO 17/157835 | 9/2017 |
| WO | WO 17/162499 | 9/2017 |
| WO | WO 17/186468 | 11/2017 |
| WO | WO 17/200797 | 11/2017 |
| WO | WO 18/015547 | 1/2018 |
| WO | WO 18/021409 | 2/2018 |
| WO | WO 18/050474 | 3/2018 |
| WO | WO 18/065614 | 4/2018 |
| WO | WO 18/04179 | 6/2018 |
| WO | WO 18/106978 | 6/2018 |
| WO | WO 18/114845 | 6/2018 |
| WO | WO 18/138247 | 8/2018 |
| WO | WO 18/138270 | 8/2018 |
| WO | WO 18/145032 | 8/2018 |
| WO | WO 18/158509 | 9/2018 |
| WO | WO 18/232618 | 12/2018 |
| WO | WO 18/232619 | 12/2018 |
| WO | WO 19/021015 | 1/2019 |
| WO | WO 19/043219 | 3/2019 |
| WO | WO 19/047587 | 3/2019 |
| WO | WO 19/094506 | 5/2019 |
| WO | WO 19/108596 | 6/2019 |
| WO | WO 19/125637 | 6/2019 |
| WO | WO 19/145196 | 8/2019 |
| WO | WO 19/166749 | 9/2019 |
| WO | WO 19/194869 | 10/2019 |

(56) References Cited

FOREIGN PATENT DOCUMENTS

| | | |
|---|---|---|
| WO | WO 19/197376 | 10/2019 |
| WO | WO 19/215450 | 11/2019 |
| WO | WO 20/007652 | 1/2020 |
| WO | WO 20/007654 | 1/2020 |
| WO | WO 20/043718 | 3/2020 |
| WO | WO 20/053518 | 3/2020 |
| WO | WO 20/065296 | 4/2020 |
| WO | WO 20/065297 | 4/2020 |
| WO | WO 20/074241 | 4/2020 |
| WO | WO 20/115478 | 6/2020 |
| WO | WO 20/120563 | 6/2020 |
| WO | WO 20/178145 | 9/2020 |
| WO | WO 20/185641 | 9/2020 |
| WO | WO 20/201437 | 10/2020 |
| WO | WO 20/201438 | 10/2020 |
| WO | WO 21/089851 | 5/2021 |
| WO | WO 21/217512 | 11/2021 |
| WO | WO 21/219564 | 11/2021 |
| WO | WO 21/231285 | 11/2021 |

OTHER PUBLICATIONS

Audouard, et al., Mar. 26-31, 2000, Corrosion Performance and Field Experience With Super Duplex and Super Austenitic Stainless Steels in FGD Systems, Corrosion 2000, 8 pp.

Azo Materials, "Stainless Steel—Grade 420," Oct. 23, 2001, <https://www.azom.com/article.aspx?ArticleID=972>, accessed Aug. 15, 2017.

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

Cheney, et al.: "Development of quaternary Fe-based bulk metallic glasses," Materials Science and Engineering, vol. 492, No. 1-2, Sep. 25, 2008, pp. 230-235.

Cheney: Modeling the Glass Forming Ability of Metals. A Dissertation submitted in partial satisfaction of the Requirements for the degree of Doctor of Philosophy. University of California, San Diego. Dec. 2007.

C—Mo Phase Diagram [online], [retrieved on Jan. 27, 2015]. Retrieved from the Internet: <URL:http://factsage.cn/fact/documentation/SGTE/C-Mo.jpg.

C—Nb Phase Diagram [online], [retrieved on Jan. 27, 2015]. Retrieved from the Internet: <URL:http://www.crct.polymtl.ca/fact/documentation/BINARY/C-Nb.jpg.

Conversion Chart of Vickers Hardness (HV) to Rockwell C (HCR).

Cr—C Phase Diagram [online], [retrieved on Jan. 27, 2015]. Retrieved from the Internet: http://www.azom.com/work/3ud2quvLOU9g4VBMjVEh_files/image002.gif.

Crucible Industries LLC, Jun. 3, 2010, Crucible CPM S90V@ data sheet, retrieved from the internet Mar. 14, 2019, https://www.crucible.com/PDFs/DataSheets2010/dsS90v1%202010.pdf, 2 pp.

Davis, Jr, ed. Dec. 1994, Stainless steels. ASM International, Materials Park, OH, p. 447.

Fujiki et al., 1988, The sintering phenomena and heat-treated properties of carbides and borides precipitated p/m alloys made of H.S.S. powder, Japan Society of Powder and Powder Metallurgy. 35(3):119-123.

Gorni, Oct. 9, 2003, Austenite transformation temperatures: ferrite start and finish, in Steel Forming and Heath Treating Handbook, pp. 26-43.

Iron-Carbon (Fe—C) Phase diagram [online], [retrieved on Jan. 27, 2014]. Retrieved from the internet: <URL:http://www.calphad.com/iron-carbon.html>.

Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.

Kumashiro et al., May 31, 1980, The vickers micro-hardness of nonstoichiometric niobium carbide and vanadium carbide single crystals up to 1500C., Journal of Materials Science, 15(5):1321-1324.

Kushner et al., 1992, Thermal Spray Coatings, in Blau (ed) ASM Handbook, vol. 18, Friction, Lubrication, and Wear Technolgoy, pp. 829-833.

Li et al., Feb. 28, 2000, Temperature dependence of the hardness of single-phase cementite films prepared by an electron-shower PVD method, Journal of the Japan Institute of Metals and Materials, 64(2):134-140.

Liu et al., Jan. 14, 2000, Measurement of austenite-to-ferrite transformation temperature after multi-pass deformation of steels, Materials Science and Engineering A, 194(1):L15-L18.

Miracle, D.B.: The efficient cluster packing model—An atomic structural model for metallic glasses, Acta Materialia vol. 54, Issue 16, Sep. 2006, pp. 4317-4336.

Miyoshi et al., Apr. 25, 1965, High temperature hardness of Wc, Tic, TaC, NbC and their mixed carbides, Journal of the Japan Society of Powder and Powder Metalurgy, 12(2):78-84.

Ohmura, Dec. 2003, Evaluation of temper softening behavior of Fe—C binary martensitic steels by nanoindentation, Scripta Materialia, 49(12):1157-1162.

Senkov et al., Jun. 23, 2010, Refractory high-entropy alloys, Intermetallics, 18:1758-1765.

Teng: "Processing, Microstructures, and Properties of Aluminide-Strengthened Ferritic Steels," The University of Tennessee, Knoxville, Dec. 2011.

Tillack, et al.: "Selection of Nickel, Nickel-Copper, Nickel-Cromium, and Nickel-Chromium-Iron Allows", ASM Handbook, Welding, Brazing and Soldering, vol. 6,Dec. 1, 1993 (Dec. 1, 1993) pp. 586-592, XP008097120, p. 589.

Titanium-Boron (TiB) Phase Diagram [online], [retrieved on Jan. 27, 2015]. Retrieved from the internet:<URL:http://www.calphad.com/titaniumboron.html>.

Tucker , 2013, Introduction to Thermal Spray Technology, ASM Handbook, vol. 5A, pp. 3-9.

Wang et al., Jul. 2014, Effect of molybdenum, manganese and tungsten contents on the corrosion behavior and hardness of iron-based metallic glasses, Materials and Corrosion, 65(7):733-741.

Wank et al., 2007, Behavior of thermally sprayed wear protective coatings exposed to different abrasive wear conditions in comparison to hard chromium platings, 7 pp.

Wikipedia, Refractory metals, https://en/wikipedia.org/wiki/Refractory_metals.

Yamamoto et al., 2014, Influence of Mo and W on high temperature hardness of M7C3 carbide in high chromium white cast iron, Materials Transactions, 55(4):684-689.

Yano et al., Apr. 2011, Modification of NiAl intermetallic coatings processed by PTA with chromium carbides, ASTM International Journal, 8(4):190-204.

Yoo et al., Jun. 2006, The effect of boron on the wear behavior of iron-based hardfacing alloys for nuclear power plants valves, Journal of Nuclear Materials, 352:90-96.

Zhu et al., 2017, Microstructure and sliding wear performance of Cr7C3—(Ni,Cr)3(Al,Cr) coating deposited from Cr7C3 in situ formed atomized powder, J. Therm Spray Tech, 26:254-264.

International Search Report and Written Opinion re PCT Application No. PCT/US2020/031043, mailed Jun. 19, 2020.

POWDER FEEDSTOCK FOR WEAR RESISTANT BULK WELDING CONFIGURED TO OPTIMIZE MANUFACTURABILITY

INCORPORATION BY REFERENCE TO ANY PRIORITY APPLICATIONS

This application claims from the benefit of U.S. App. No. 62/842,867, filed May 3, 2019, and entitled "POWDER FEEDSTOCK FOR WEAR RESISTANT BULK WELDING CONFIGURED TO OPTIMIZE MANUFACTURABILITY", the entirety of which is incorporated by reference herein.

BACKGROUND

Field

This disclosure generally relates to hardfacing/hardbanding materials, alloy or powder compositions used to make such hardfacing/hardbanding materials, methods of forming the hardfacing/hardbanding materials, and the components or substrates incorporating or protected by these hardfacing/hardbanding materials.

Description of the Related Art

There have also been efforts within the Fe—Cr—C—B system with the addition of other hardphase forming elements such as U.S. Pat. No. 8,704,134, hereby incorporated by reference in its entirety. This patent describes a compositional space whereby a particular wear performance and hardness using borocarbides in an austenitic or ferritic ferrous matrix. U.S. Pat. No. 8,704,134 also teaches a welding method whereby glass compositions containing precipitates form on a substrate which, as demonstrated in the disclosure of U.S. Pat. No. 8,704,134, tend towards forming long needle-shaped borocarbide structures. While these structures provide excellent wear resistance, they can lower the toughness of the weld overlay.

U.S. Pat. No. 4,365,994, hereby incorporated by reference in its entirety, describes boride containing alloys. However, it does not describe the thermodynamic criteria, phases, and morphology described in this disclosure. Additionally, it does not describe alloy spaces that specifically control refractory content and thermodynamic characteristics to enable manufacturability via the bulk welding process.

U.S. Pat. No. 7,553,382, hereby incorporated by reference in its entirety, describes niobium containing and iron based glass alloys. Specifically these alloys are described as containing non glass elements and $M_{23}(C,B)_6$ and/or $M_7(C,B)_3$. This disclosure describes alloys designed to be free of both $M_{23}(C,B)_6$ and $M_7(C,B)_3$ and does not rely on glass formation to develop the final properties of the material.

U.S. Pat. App. No. 20160/168670, hereby incorporated by reference in its entirety, teaches coating alloys that comprise thermodynamic characteristics with a high phase fraction of near spherical borides and total borides.

SUMMARY

Disclosed herein are embodiments of a powder feedstock configured for bulk welding, the powder feedstock comprising Fe and, in wt. %: B: about 6.5 to about 9.5, C: about 0.5 to about 3, Cr: about 15 to about 25, Mo+W: about 15 to about 25, and Nb: about 1 to about 15.

In some embodiments, Fe: about 20 to about 60. In some embodiments, Nb: about 3 to about 15. In some embodiments, Nb: about 3 to about 10.

In some embodiments, the powder feedstock includes, in wt. %, Fe and B: about 8.07-about 9.07, C: about 0.94-about 1.34, Cr: about 20.73-about 22.73, Mo: about 21.84-about 23.84, Nb: 5.02-6.02, and Si: up to 1% silicon.

In some embodiments, the powder feedstock can be configured to form a matrix and is characterized by having, under thermodynamic conditions, a total mole fraction of MC carbides at 1300K of between about 1% and about 9%, wherein M is selected from the group consisting of Nb, Ti, Zr, V, Ta, W, and/or Hf. In some embodiments, M is Nb. In some embodiments, the total mole fraction of MC carbides at 1300K can be between about 2% and about 8%.

In some embodiments, the powder feedstock can be configured to form a matrix and is characterized by having, under thermodynamic conditions, a total mole fraction of metallic matrix phases with a face-centered or body-centered cubic structure at 1300K is between about 5 and about 20%.

In some embodiments, the powder feedstock can be configured to form a matrix and is characterized by having a total boride mole fraction at 1300K of between about 40 and about 90%. In some embodiments, the total boride mole fraction at 1300K can be between about 75 and about 85%.

In some embodiments, the powder can comprise ferro molybdenum, ferro boron, ferro chrome, boron carbide, and ferro niobium powders. In some embodiments, the powder feedstock can comprise 20 to 30 wt. % ferro boron, 25 to 40 wt. % ferro molybdenum, 5 to 15 wt. % ferro niobium, 3 to 8 wt. % boron carbide, 20 to 35 wt. % ferro chromium.

Also disclosed herein are embodiments of a weld formed from the powder feedstock of the disclosure. In some embodiments, the weld can be deposited via arc welding in combination with a steel electrode consumable to form a wearplate.

In some embodiments, the weld can comprise Fe and, in wt. %: B: about 2.5 to about 3.8, C: about 0.2 to about 1.2, Nb: about 0.5 to about 5, Cr: about 5 to about 12, and Mo: about 5 to about 12.

In some embodiments, the weld can comprise near spherical borides where Mo+W>20 wt %, near spherical MC carbides, and <10 mol % hypereutectic $(Fe,Cr)_2B$. In some embodiments, the weld can have a hardness of ≥about 55 HRC. In some embodiments, the weld can have a hardness of ≥about 64 HRC. In some embodiments, the weld can have an ASTM G65 procedure A mass loss of ≤about 0.2 g. In some embodiments, the weld can have an ASTM G65 procedure A mass loss of ≤about 0.08 g.

In some embodiments, the weld can comprise a total volume fraction of MC carbides of between about 1% and about 9%, wherein M is selected from the group consisting of Nb, Ti, Zr, V, Ta, W, and/or Hf. In some embodiments, M is Nb. In some embodiments, the total mole fraction of MC carbides is between about 2% and about 8%. In some embodiments, the weld can comprise a total volume fraction of metallic matrix phases with a face-centered or body-centered cubic structure of between about 5 and about 20%. In some embodiments, the weld can comprise a matrix having a total boride volume fraction of between about 40 and about 90%. In some embodiments, the total boride volume fraction is between about 75 and about 85%.

Also disclosed herein are embodiments of a method of bulk welding from a powder feedstock, the method comprising applying the powder feedstock to form a weld, the powder feedstock comprising: B: about 6.5 to about 9.5, C:

about 0.5 to about 3, Cr: about 15 to about 25, Mo+W: about 15 to about 25, and Nb: about 1 to about 15.

Embodiments of a powder feedstock as disclosed herein.

Embodiments of a method of bulk welding as disclosed herein.

DETAILED DESCRIPTION

Figure 1:
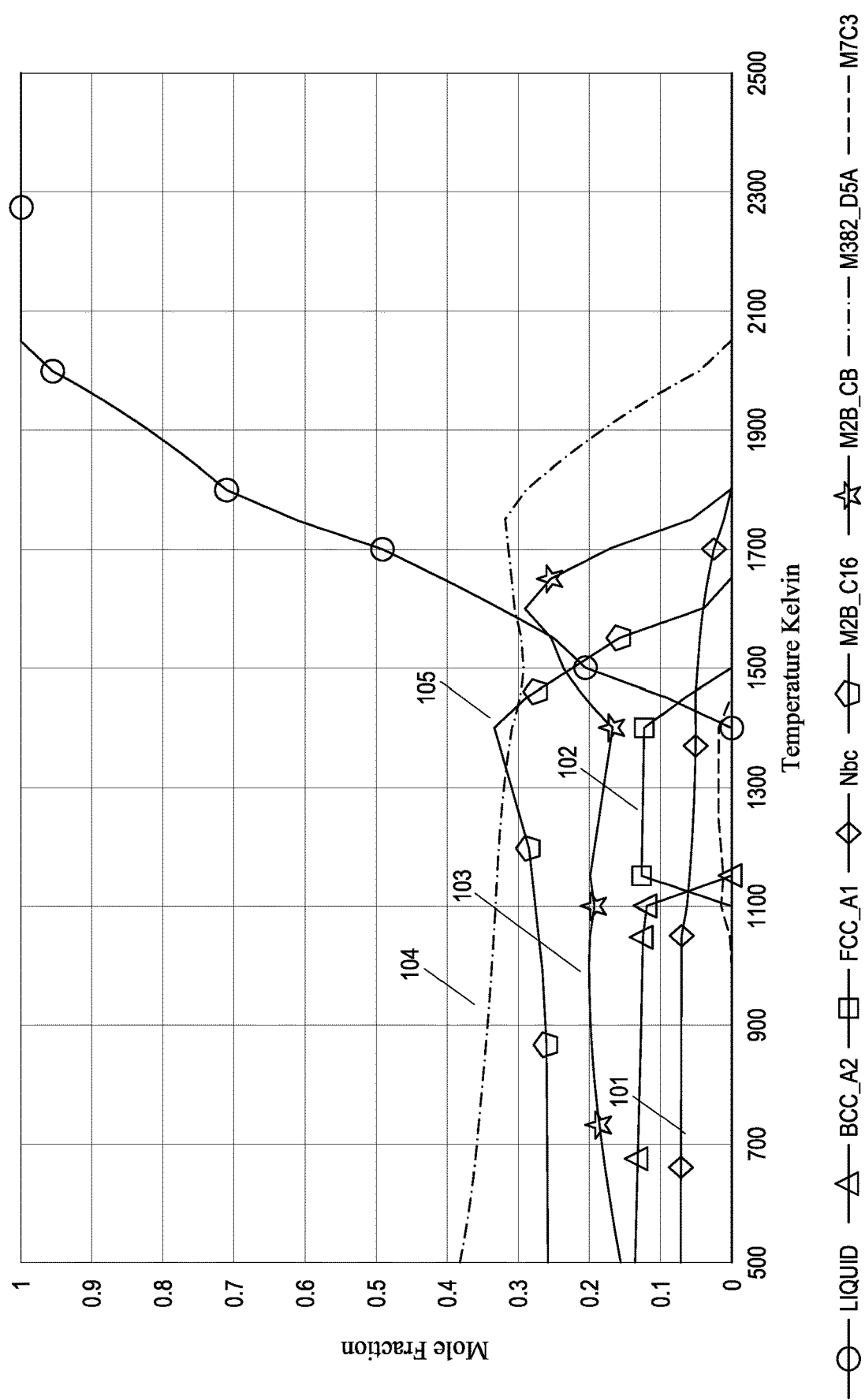
FIG. 1 illustrates an equilibrium solidification diagram of an example disclosed alloy (X29) having the composition $B_{7.04}C_{0.96}Cr_{18.7}Mo_{17.6}Nb_{4.7}Fe_{balance}$.

In certain hardfacing applications using a bulk welding process, it can be advantageous to utilize powder feedstock that minimizes unmelted particles after welding, easily has flux detach, and/or maintains stable process conditions, such as voltage, amperage, wire feed, table traverse rate, oscillation width, and powder feed rate over a range of process parameters.

Disclosed herein are embodiments of alloys configured as a blend of raw material constituents or configured as a homogeneous powder that are used as feedstock to form wear resistant coatings, such as for bulk welding applications, achieving the properties listed above. Alloys that meet the embodiments of this disclosure have beneficial deposition characteristics including low spatter during welding, controlled dilution with substrates, easy flux detachment, low percentage of unmelts, and wide processing windows.

As disclosed herein, the term alloy can refer to the chemical composition forming the powder disclosed within, the powder itself, and the composition of the metal component formed by the heating and/or deposition of the powder.

The technology in this disclosure occupies a unique balance between achieving advantageous wear resistant and impact resistant microstructure and compatibility with the bulk welding process. In general, it is beneficial to utilize refractory elements such as Mo and Nb to form borides and carbides of desirable morphology for performance. Reduction of these elements will generally increase the potential of an undesirable microstructure resulting in low impact resistance. However, as refractory elements are increased the weldability becomes more challenging particularly in the process of bulk welding. Refractory elements are by definition, high melting temperature, and their increased utilization will increasingly result in unmelts. Unmelts are particles which have not been melted during the welding process but are contained within the overall weld bead. The presence of unmelts is un-desirable because they decrease weld performance. A typical option for reducing unmelts is to increase the welding power. However, as welding power is increased unmelts will decrease but additional problems will arise. Dilution will increase with welding power, which is undesirable beyond 38% for a variety of reasons.

Further, embodiments of this disclosure show additional inventive effort to enable compatibility with a specific welding process known as bulk welding. The preferred embodiments and majority of potential alloy compositions described in U.S. Pat. Pub. No. 2016/0168670 are not compatible with bulk welding.

In contrast to the U.S. Pat. No. 8,704,134 discussed above, embodiments of this disclosure describes criteria that allow for precise control over the performance, microstructural, and thermodynamic criteria. Specifically, this can be done by controlling the chemistry to reduce, or completely exclude, carbides and borocarbides that have detrimental performance impacts. This exclusion can allow for control of toughness, wear resistance, and hardness not described in the referenced art.

Chemistry

In some embodiments, alloys powder feedstocks can be described by a range in chemistry. This range is used to describe the blended or atomized powder configured to form a wearpart or hardfacing layer after welding. For example, in some embodiments the alloys can comprise the following, in weight percent:

B: 5-10 (or about 5-about 10);
Cr: 10-30 (or about 10-about 30);
Fe: 20-60 (or about 20-about 60);
Mo+W: 10-30 (or about 10-about 30).

In some embodiments an alloy can comprise by weight percent:

B: 5-10 (or about 5-about 10);
C: 0.5-3 (or about 0.5-about 3);
Cr: 10-30 (or about 10-about 30);
Fe: 20-60 (or about 20-about 60);
Mo+W: 10-30 (or about 10-about 30).

In some embodiments an alloy can comprise by weight percent:

B: 5-10 (or about 5-about 10);
C: 0.5-3 (or about 0.5-about 3);
Cr: 10-30 (or about 10-about 30);
Fe: 20-60 (or about 20-about 60);
Mo+W: 10-30 (or about 10-about 30);
Nb: 1-15 (or about 1-about 15).

In some embodiments an alloy can comprise by weight percent:

B: 6.5-9.5 (or about 6.5-about 9.5);
C: 0.5-3 (or about 0.5-about 3);
Cr: 15-25 (or about 15-about 25);
Fe: 20-60 (or about 20-about 60);
Mo+W: 15-25 (or about 15-about 25);
Nb: 1-15 (or about 1-about 15).

In some embodiments an alloy can comprise by weight percent:

B: 6.5-9.5 (or about 6.5-about 9.5);
C: 0.5-3 (or about 0.5-about 3);
Cr: 15-25 (or about 15-about 25);
Fe: 20-60 (or about 20-about 60);
Mo+W: 15-25 (or about 15-about 25);
Nb: 3-15 (or about 3-about 15).

In some embodiments an alloy can comprise by weight percent:

B: 6.5-9.5 (or about 6.5-about 9.5);
C: 0.5-3 (or about 0.5-about 3);
Cr: 15-25 (or about 15-about 25);
Fe: 20-60 (or about 20-about 60);
Mo+W: 15-25 (or about 15-about 25);
Nb: 3-10 (or about 3-about 10).

In some embodiments an alloy can comprise Fe and, by weight percent:

B: 8.1-9.0 (or about 8.1-about 9.0);
C: 1-1.3 (or about 1-about 1.3);

Nb: 5.4-5.8 (or about 5.4-about 5.8);
Cr: 19.7-21.9 (or about 19.7-about 21.9);
Mo: 21.7-23.2 (or about 21.7-about 23.2).

In some embodiments an alloy can comprise Fe and, by weight percent:
- B: 7.3-9.9 (or about 7.3-about 9.9);
- C: 0.9-1.5 (or about 0.9-about 1.5);
- Nb: 4.8-6.3 (or about 4.8-about 6.3);
- Cr: 17.7-24.1 (or about 17.7-about 24.1);
- Mo: 19.5-25.5 (or about 19.5-about 25.5).

In some embodiments an alloy can comprise Fe and, by weight percent:
- B: 7.7-9.4 (or about 7.7 to about 9.4);
- C: 1.0-1.2 (or about 1.0-about 1.2);
- Cr: 19.5-23.9 (or about 19.5-about 23.9);
- Mo: 20.6-25.1 (or about 20.6-about 25.1);
- Nb: 4.9-6.1 (or about 4.9-about 6.1).

In some embodiments an alloy can comprise Fe and, by weight percent:
- B: 6.8-10.3 (or about 6.8-about 10.3);
- C: 0.9-1.4 (or about 0.9-about 1.4);
- Cr: 17.4-26.1 (or about 17.4-about 26.1);
- Mo: 18.3-27.4 (or about 18.3-about 27.4);
- Nb: 4.4-6.6 (or about 4.4-about 6.6).

In some embodiments an alloy can comprise Fe and, by weight percent:
- B: 8.07-9.07 (or about 8.07-about 9.07);
- C: 0.94-1.34 (or about 0.94-about 1.34);
- Cr: 20.73-22.73 (or about 20.73-about 22.73);
- Mo: 21.84-23.84 (or about 21.84-about 23.84);
- Nb: 5.02-6.02 (or about 5.02-about 6.02).

For any of the above compositions, the alloy can further include silicon. In some embodiments, the alloys may contain greater than 0.1, 0.2, 0.3, 0.4, 0.5, 0.6, 0.7, 0.8, or 0.9 (or about 0.1, about 0.2, about 0.3, about 0.4, about 0.5, about 0.6, about 0.7, about 0.8, or about 0.9) wt. % silicon. In some embodiments, the alloys may contain less than 0.1, 0.2, 0.3, 0.4, 0.5, 0.6, 0.7, 0.8, 0.9, or 1.0 (or about 0.1, about 0.2, about 0.3, about 0.4, about 0.5, about 0.6, about 0.7, about 0.8, about 0.9, or about 1.0) wt. % silicon.

For any of the above compositions, Nb can be substituted for one or more of Nb, Ti, Zr, V, Ta, and Hf in equivalent percentages.

In some embodiments the alloys may be described instead as a blend of raw material powders. For example, in some embodiments the alloys can comprise the following in weight percent:
- Ferro boron (FeB): 20-30 (or about 20-about 30);
- Ferro molybdenum (FeMo): 25-40 (or about 25-about 40);
- Ferro niobium (FeNb): 5-15 (or about 5-about 15);
- Boron carbide ($B_4C$): 3-8 (or about 3-about 8).

In some embodiments an alloy can comprise, in weight percent:
- Ferro boron: 20-30 (or about 20-about 30);
- Ferro molybdenum: 25-40 (or about 25-about 40);
- Ferro niobium: 5-15 (or about 5-about 15);
- Boron carbide: 3-8 (or about 3-about 8);
- Ferro chromium (FeCr): 20-35 (or about 20-about 35).

In some embodiments the alloy can include, in weight percent:
- Ferro boron: 22-27 (or about 22-about 27);
- Ferro molybdenum: 30-36 (or about 30-about 36);
- Ferro niobium: 7.7-9.4 (or about 7.7-about 9.4);
- Boron carbide: 4.8-5.8 (or about 4.8-about 5.8);
- Ferro chromium: 26-32 (or about 26-about 32).

In some embodiments the alloy can include, by weight percent:
- Ferro boron: 19-29 (or about 19-about 29);
- Ferro molybdenum: 26-39 (or about 26-about 39);
- Ferro niobium: 6.6-10.2 (or about 6.6-about 10.2);
- Boron carbide: 4.2-6.4 (or about 4.2-about 6.4);
- Ferro chromium: 26-39 (or about 26-about 39).

For the above recited compositions, the raw material powders can be broken down as below in certain embodiments.
- Ferro boron: 15-21 (or about 15-about 21) wt. % B, Fe BAL.
- Ferro molybdenum: 60-75 (or about 60-about 75) wt. % Mo, Fe: BAL.
- Ferro niobium: 58-73 (or about 58-about 73) wt. % Nb, Fe: BAL.
- Boron carbide: 18-24 (or about 18-about 24) wt. % C, B: BAL.
- Ferro chromium: 62-83 (or about 62-about 83) wt. % Cr, Fe: BAL.

For all of the above compositions, they can further include up to 5 (or about 5) wt. % impurities.

From an elemental balance standpoint, a reduction of refractory elements such as Mo, Nb, and W or an increase in iron in alloys feedstock powders can be correlated with improved manufacturability. For example the alloy P59-X19, which is outside the embodiments of this disclosure, in Table 2 has a total refractory content (Mo+Nb+W) of 34.7 wt. % and a total iron content of 32 wt. %. The alloy X29 with good manufacturing performance and which is within the embodiments of this disclosure, has a total refractory content of 22.32 wt. % and a total iron content of 49.9 wt. %. The alloy X25 within this disclosure has a total refractory content of 29 wt. % and a total iron content of 41 wt. %.

Although a reduction in refractory content leads to improved welding performance, these elements, (Mo, Nb, W) are advantageous in the alloy feedstock powder to form the desired phases and phase fractions in the coating. Pat. App. Pub. No. 2016/0168670 describes in detail the benefits of borides and/or carbides formed from these refractory elements. Benefits include increased phase hardness correlated to improved wear performance and near spherical morphology which improves coating toughness.

In some embodiments of this disclosure, alloy powder feedstocks have between 15 wt. % and 28 wt. % (or between about 15 and about 28 wt. %) of the refractory elements Mo+Nb+W. In some embodiments, the alloy powder feedstock can have been 24 wt. % and 32 wt. % (or between about 24 and about 32 wt. %) of the refractory elements Mo+Nb+W. In some embodiments, the alloy powder feedstock can have been 27 wt. % and 29 wt. % (or between about 27 and about 29 wt. %) of the refractory elements Mo+Nb+W. In some embodiments of this disclosure alloy powder feedstocks have greater than 35 wt. % Fe (or greater than about 35 wt. %).

Table 1 below demonstrates alloy feedstock blends intended to produce coating chemistries described in U.S. Pat. App. No. 2016/0168670, P59-X20 & P29-X27. However, the bulk welding process being so fundamentally different that there is essentially no similarity between the feedstock chemistries of a bulk welding powder (to which this disclosure focuses on) and a cored wire (to which 2016/0168670 focuses on). As will be shown, several unsuccessful attempts were made to transition these embodiments into the bulk welding process, and additional inventive effort was required. The bulk welding process can involve four separate constituents which are melted together. The alloy blend as shown in the table below is itself composed of a mixture of different alloying ingredients, in these for example $B_4C$, FeMo, FeB, FeCr, FeNb. The alloy blend if melted together will form a powder chemistry, also shown in the table below. As discovered through the course of this study, particular ingredients of the alloy blend create welding difficulties such as FeMo, $B_4C$, and FeNb. Furthermore, certain powder chemistries create welding difficulties. In the table, all values can additionally be about said value (for example 22.0 wt. % Cr is also about 22.0 wt. % Cr).

In addition to the alloy blend, three other constituents are involved in the bulk welding process which affect the resultant coating chemistry and weld quality: the welding electrode, the substrate, and the flux. The welding electrode and substrate are commonly mild steel alloys and are intended to melt together with the alloy blend to create a coating chemistry. The flux protects the molten metal during the process, but is not intended to significantly affect the coating chemistry. However, certain alloy blend ingredients and powder chemistries will react with the flux producing undesirable results such as flux sticking which is unacceptable in wear plate manufacturing.

In some embodiments, a thermodynamic criterion is the mole fraction of MC carbides MC carbides comprise a face centered cubic structure (FCC) where M comprises Nb, Ti, Zr, V, Ta, and/or Hf. A high mole fraction of MC carbides in the alloy correlates to reduced weld performance including but not limited to reduced arc stability, presence of unmelts in the deposit, poor deposition efficiency, poor surface quality, poor flux detachment characteristics. $M_7C_3$, $M_{23}C_6$, and $M_3C$, are examples of carbides that are not MC carbides.

The mole fraction of MC carbides is the measured as the sum, at equilibrium, of all carbide phases that adhere to the above composition. This criteria is measured at 1300K. In the alloy P59-X29 of FIG. 1 the only MC carbide is NbC, so the mole fraction of MC carbide is 5.3% [101]. In the alloy P59-X19 FIG. 2 the MC carbide mole fraction is 12.8% [201]. P59-X29 and P59-X19 are designed to form analogous microstructures when deposited as a bulk weld, with similar phase fractions in the deposited coating and expected wear performance. However in a production environment P59-X29 works with controllable deposit characteristics such as weldability, consistent base dilution, and reliable flux detachment. The alloy P59-X19 does not have good

TABLE 1

Shows alloys inside and outside of the embodiments of this disclosure in wt. %.

| | Blend Chemistry | | | | | | | | Powder Chemistry | | | | | |
| | | | | ELC- | | | | | | | | | | |
| | $B_4C$ | Cr | FeMo | FeB | FeCr | FeNb | Fe | Total | B | C | Nb | Cr | Fe | Mo | Si |
|---|---|---|---|---|---|---|---|---|---|---|---|---|---|---|---|
| p59-X19 | 6.7% | 22.0% | 33.4% | 17.0% | 0.0% | 20.9% | 0.0% | 100.00% | 8.38 | 1.46 | 13.90 | 21.85 | 32.03 | 20.77 | 0.73 |
| p59-X27 | 9.3% | 0.0% | 34.0% | 6.4% | 29.1% | 21.2% | 0.0% | 100.00% | 8.48 | 1.98 | 14.10 | 22.00 | 30.75 | 21.15 | 0.94 |
| p59-X25 | 5.0% | 0.0% | 33.3% | 24.5% | 28.9% | 8.3% | 0.0% | 100.00% | 8.42 | 1.12 | 5.52 | 21.85 | 41.13 | 20.71 | 0.60 |
| P59-X25.1 | 5.3% | 0 | 33.0% | 24.5% | 28.7% | 8.5% | 0% | 100% | 8.57 | 1.14 | 5.52 | 21.73 | 39.8 | 22.84 | 0.4 |
| p59-X29 | 4.3% | 0.0% | 28.3% | 20.0% | 24.7% | 7.1% | 15.6% | 100.00% | 7.04 | 0.96 | 4.72 | 18.67 | 49.94 | 17.60 | 0.51 |

The disclosed alloys can incorporate the above elemental constituents to a total of 100 wt. %. In some embodiments, the alloy may include, may be limited to, or may consist essentially of the above named elements. In some embodiments, the alloy may include 2 wt. % (or about 2 wt. %) or less, 1 wt. % (or about 1 wt. %) or less, 0.5 wt. % (or about 0.5 wt. %) or less, 0.1 wt. % (or about 0.1 wt. %) or less or 0.01 wt. % (or about 0.01 wt. %) or less of impurities, or any range between any of these values. Impurities may be understood as elements or compositions that may be included in the alloys due to inclusion in the feedstock components, through introduction in the manufacturing process.

Further, the Fe content identified in all of the compositions described in the above paragraphs may be the balance of the composition, or alternatively, where Fe is provided as the balance, the balance of the composition may comprise Fe and other elements. In some embodiments, the balance may consist essentially of Fe and may include incidental impurities.

Thermodynamic Criteria

Figure 2:
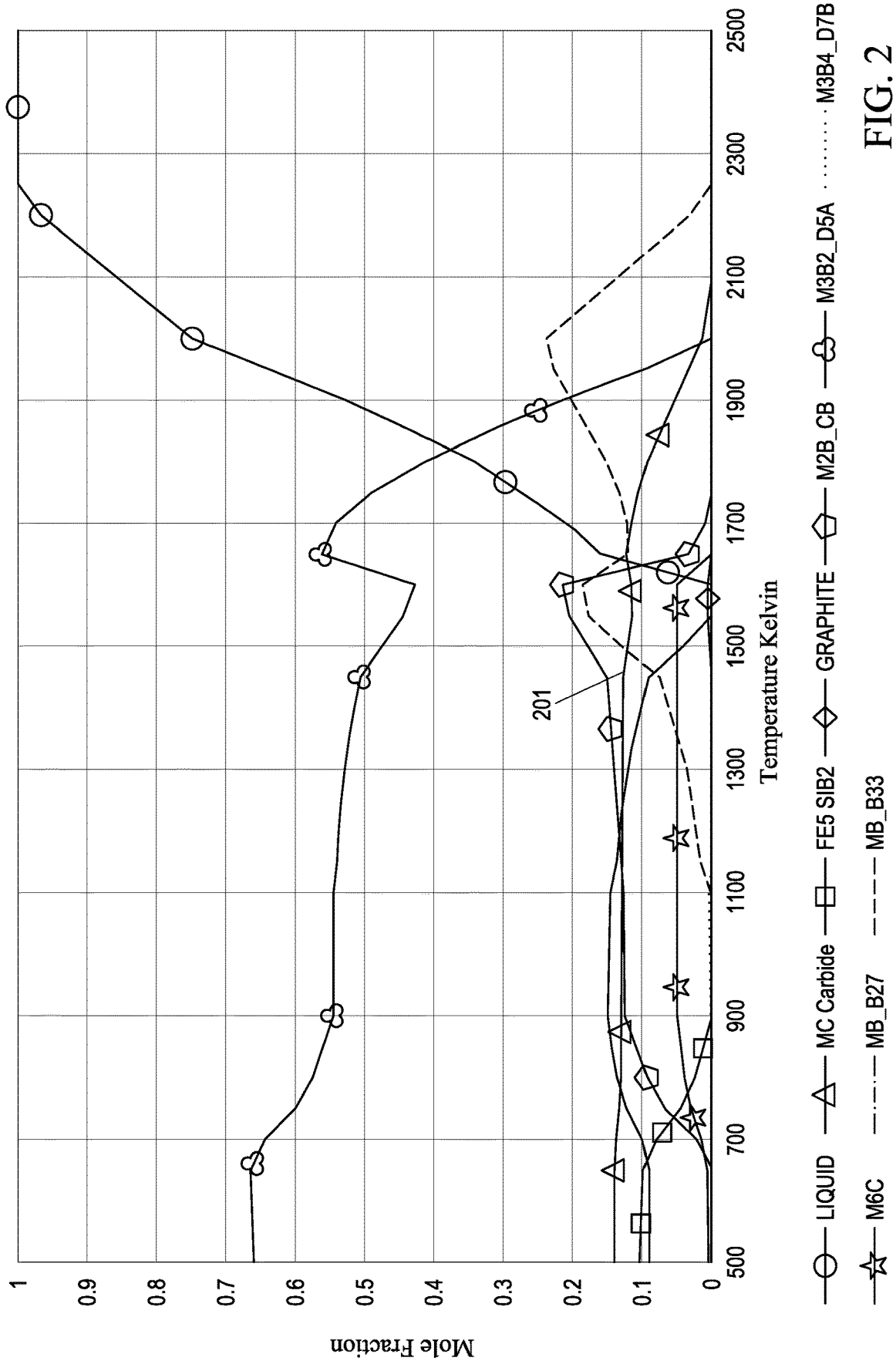
FIG. 2 illustrates an equilibrium solidification diagram of an alloy outside of this disclosure (X27) having the composition $B_{8.48}C_{1.98}Cr_{22.0}Mo_{21.1}Nb_{14.1}Fe_{balance}$ in weight percent
Figure 3:
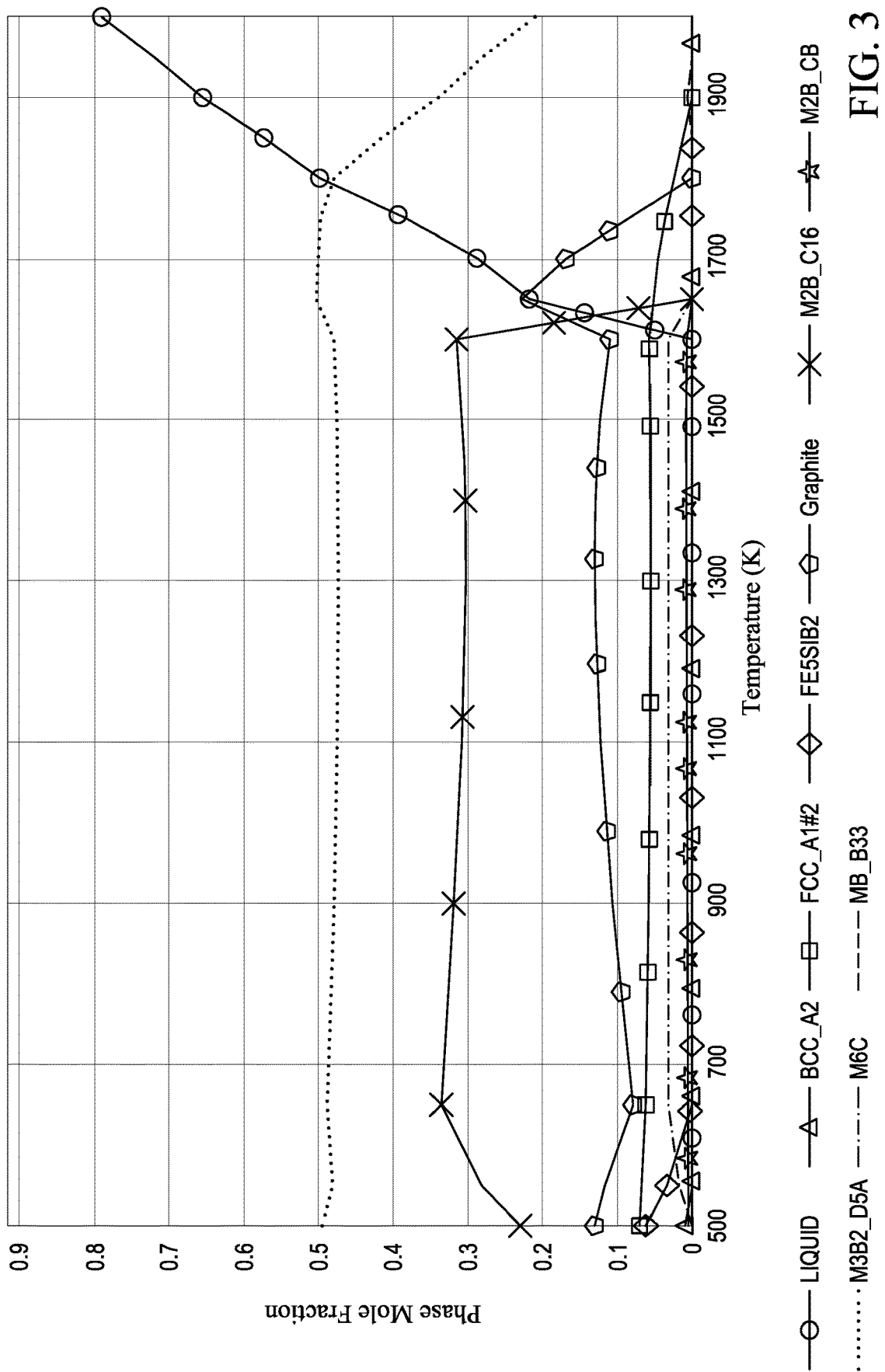
FIG. 3 illustrates an equilibrium solidification diagram of an alloy outside of this disclosure (X25) having the composition $B_{8.42}C_{1.12}Nb_{5.52}Cr_{21.85}Fe_{41.13}Mo_{20.71}Si_{0.60}$ in weight percent.

Embodiments of alloys of the disclosure can be fully described by certain equilibrium thermodynamic criteria, especially for the powder feedstock. The alloys can meet some, or all, of the described thermodynamic criteria. FIGS. 1, 2, and 3 illustrate equilibrium solidification diagrams of embodiments of the disclosure as well as alloys outside of this disclosure.

characteristics in production with unreliable substrate dilution and poor repeatability conditions. Increased MC carbide fraction is thus correlated with reduced manufacturing reliability.

In some embodiments, the MC carbide mole fraction can be ≥0.5% and <9.5% (or ≥about 0.5% and <about 9.5%). In some embodiments, the MC carbide mole fraction can be ≥1% and <9.5% (or ≥about 1% and <about 9.5%). In some embodiments, the MC carbide mole fraction can be ≥1% and <9% (or ≥about 1% and <about 9%)). In some embodiments, the MC carbide mole fraction can be ≥1% and <8% (or ≥about 1% and <about 8%). In some embodiments, the MC carbide mole fraction can be ≥2% and <9% (or ≥about 2% and <about 9%). In some embodiments, the MC carbide mole fraction can be ≥3% and <9% (or ≥about 3% and <about 9%). In some embodiments, the MC carbide mole fraction can be ≥2% and <8% (or ≥about 2% and <about 8%).

In some embodiments the MC carbides may comprise predominantly niobium as the metallic component. These will be known as niobium carbides defined as MC type carbides where M comprises ≥50% niobium (or ≥about 50%).

In some embodiments, the niobium carbide mole fraction can be ≥0.5% and <9.5% (or ≥about 0.5% and <about 9.5%). In some embodiments, the niobium carbide mole fraction can be ≥1% and <9.5% (or ≥about 1% and <about 9.5%). In some embodiments, the niobium carbide mole fraction can be ≥1% and <9% (or ≥about 1% and <about 9%)). In some embodiments, the niobium carbide mole fraction can be ≥1% and <8% (or ≥about 1% and <about 8%). In some embodiments, the niobium mole fraction can be ≥2% and <9% (or ≥about 2% and ≥about 9%). In some embodiments, the niobium carbide mole fraction can be ≥3% and <9% (or ≥about 3% and <about 9%). In some embodiments, the niobium carbide mole fraction can be ≥2% and <8% (or ≥about 2% and <about 8%).

In some embodiments, a thermodynamic criterion is the mole fraction of total matrix (Total Matrix). Total matrix comprise metallic matrix phases with a face centered cubic body centered cubic structure (FCC or BCC), e.g., the matrix that would be formed in a coating. A high mole fraction of Total Matrix in the alloy correlates to improved weld performance. Low Total Matrix may cause reduced arc stability, presence of unmelts in the deposit, poor deposition efficiency, poor surface quality, and/or poor flux detachment characteristics.

The mole fraction of Total Matrix is measured as the sum, at equilibrium, of all BCC and FCC metallic phases. This criteria is measured at 1300K. In the alloy powder feedstock P59-X29 of FIG. 1 the only Total Matrix is an FCC phase, so the mole fraction of Total Matrix is 12.5% [102]. In the alloy powder feedstock P59-X19 in FIG. 2, there is not FCC or BCC matrix phase present at 1300K so the mole fraction of Total Matrix is 0%. Increased matrix fraction is correlated with improved manufacturability which may be due to improved fluidity of the weld and improved conductivity improving arc stability of deposition with increasing matrix fractions of a feedstock powder alloy.

In some embodiments, the Total Matrix mole fraction can be ≥3% and <30% (or ≥about 3% and <about 30%). In some embodiments, the Total Matrix mole fraction can be ≥5% and <30% (or ≥about 5% and <about 30%). In some embodiments, the Total Matrix mole fraction can be ≥5% and <25% (or ≥about 5% and <about 25%)). In some embodiments, the Total Matrix mole fraction can be ≥5% and <20% (or ≥about 5% and <about 20%). In some embodiments, the Total Matrix mole fraction can be ≥2% and <15% (or ≥about 2% and ≥about 15%). In some embodiments, the Total Matrix mole fraction can be ≥2% and <20% (or ≥about 2% and <about 20%). In some embodiments, the Total Matrix mole fraction can be ≥1% and <30% (or ≥about 1% and <about 30%).

In some embodiments, a thermodynamic criterion is the mole fraction of total borides. Total Boride criteria is the sum of all boride phases present in the alloy. A high mole fraction of Total Boride in the alloy correlates to improved wear performance of the deposit. Excessively high total boride may cause reduced arc stability, presence of unmelts in the deposit, poor deposition efficiency, poor surface quality, and/or poor flux detachment characteristics.

The total boride mole fraction is measured as the sum, at equilibrium, of all hard phases comprising boron at 1300K. In the alloy powder feedstock P59-X29 of FIG. 1 this is the sum of M2B_C16 [105], M2B_CB [103], and M3B2_D5A [104] for a total of 80.6%. Significantly lower levels may lead to insufficient performance in the final deposited coating. Significantly higher fractions may reduce weld fluidity or other weld characteristics that lead to poor deposit performance or manufacturability.

In some embodiments, the Total Boride mole fraction can be ≥40 and <95% (or ≥about 40% and <about 95%). In some embodiments, the Total Boride mole fraction can be ≥40% and <90% (or ≥about 50% and <about 90%). In some embodiments, the Total Boride mole fraction can be ≥60% and <90% (or ≥about 60% and <about 90%)). In some embodiments, the Total Boride mole fraction can be ≥70% and <90% (or ≥about 70% and <about 90%). In some embodiments, the Total Boride mole fraction can be ≥75% and <85% (or ≥about 75% and <about 85%). In some embodiments, the Total Boride mole fraction can be ≥70% and <95% (or ≥about 70% and <about 95%).

Microstructural Criteria

Embodiments of alloys of the disclosure can be fully described by certain microstructural criteria. The alloys can meet some, or all, of the described microstructural criteria.

In some embodiments, a microstructural criterion is the volume fraction of MC carbides MC carbides comprise a face centered cubic structure (FCC) where M comprises Nb, Ti, Zr, V, Ta, and/or Hf. A high volume fraction of MC carbides in the alloy correlates to reduced weld performance including but not limited to reduced arc stability, presence of unmelts in the deposit, poor deposition efficiency, poor surface quality, poor flux detachment characteristics. $M_7C_3$, $M_{23}C_6$, and $M_3C$, are examples of carbides that are not MC carbides.

The volume fraction of MC carbides is the measured as the sum of all carbide phases that adhere to the above composition. Increased MC carbide fraction can be correlated with reduced manufacturing reliability.

In some embodiments, the MC carbide volume fraction can be ≥0.5% and <9.5% (or ≥about 0.5% and <about 9.5%). In some embodiments, the MC carbide volume fraction can be ≥1% and <9.5% (or ≥about 1% and <about 9.5%). In some embodiments, the MC carbide volume fraction can be ≥1% and <9% (or ≥about 1% and <about 9%)). In some embodiments, the MC carbide volume fraction can be ≥1% and <8% (or ≥about 1% and ≥about 8%). In some embodiments, the MC carbide volume fraction can be ≥2% and <9% (or ≥about 2% and <about 9%). In some embodiments, the MC carbide volume fraction can be ≥3% and <9% (or ≥about 3% and <about 9%). In some embodiments, the MC carbide volume fraction can be ≥2% and <8% (or ≥about 2% and <about 8%).

In some embodiments the MC carbides may comprise predominantly niobium as the metallic component. These will be known as niobium carbides defined as MC type carbides where M comprises ≥50% niobium (or ≥about 50%).

In some embodiments, the niobium carbide volume fraction can be ≥0.5% and <9.5% (or ≥about 0.5% and <about 9.5%). In some embodiments, the niobium carbide volume fraction can be ≥1% and <9.5% (or ≥about 1% and <about 9.5%). In some embodiments, the niobium carbide volume fraction can be ≥1% and <9% (or ≥about 1% and <about 9%)). In some embodiments, the niobium carbide volume fraction can be ≥1% and <8% (or ≥about 1% and <about 8%). In some embodiments, the niobium volume fraction can be ≥2% and <9% (or ≥about 2% and <about 9%). In some embodiments, the niobium carbide volume fraction can be ≥3% and <9% (or ≥about 3% and <about 9%). In some embodiments, the niobium carbide volume fraction can be ≥2% and <8% (or ≥about 2% and <about 8%).

In some embodiments, a microstructural criterion is the volume fraction of total matrix (Total Matrix). Total matrix comprises metallic matrix phases with a face centered cubic body centered cubic structure (FCC or BCC). A high volume fraction of Total Matrix in the alloy correlates to improved weld performance. Low Total Matrix may cause reduced arc stability, presence of unmelts in the deposit, poor deposition efficiency, poor surface quality, and/or poor flux detachment characteristics.

The volume fraction of Total Matrix is measured as the sum, at equilibrium, of all BCC and FCC metallic phases. Increased matrix fraction can be correlated with improved manufacturability which may be due to improved fluidity of the weld and improved conductivity improving arc stability of deposition with increasing matrix fractions of a feedstock powder alloy.

In some embodiments, the Total Matrix volume fraction can be ≥3% and <30% (or ≥about 3% and <about 30%). In some embodiments, the Total Matrix volume fraction can be ≥5% and <30% (or ≥about 5% and <about 30%). In some embodiments, the Total Matrix volume fraction can be ≥5% and <25% (or ≥about 5% and <about 25%)). In some embodiments, the Total Matrix volume fraction can be ≥5% and <20% (or ≥about 5% and <about 20%). In some embodiments, the Total Matrix volume fraction can be ≥2% and <15% (or ≥about 2% and <about 15%). In some embodiments, the Total Matrix volume fraction can be ≥2% and <20% (or ≥about 2% and <about 20%). In some embodiments, the Total Matrix volume fraction can be ≥1% and <30% (or ≥about 1% and <about 30%).

In some embodiments, a microstructural criterion is the volume fraction of total borides. Total Boride criteria is the sum of all boride phases present in the alloy. A high volume fraction of Total Boride in the alloy correlates to improved wear performance of the deposit. Excessively high total boride may cause reduced arc stability, presence of unmelts in the deposit, poor deposition efficiency, poor surface quality, and/or poor flux detachment characteristics.

The total boride volume fraction is measured as the sum of all hard phases comprising boron. Significantly lower levels may lead to insufficient performance in the final deposited coating. Significantly higher fractions may reduce weld fluidity or other weld characteristics that lead to poor deposit performance or manufacturability.

In some embodiments, the Total Boride volume fraction can be ≥40 and <95% (or ≥about 40% and <about 95%). In some embodiments, the Total Boride volume fraction can be ≥40% and <90% (or ≥about 50% and ≥about 90%). In some embodiments, the Total Boride volume fraction can be ≥60% and <90% (or ≥about 60% and <about 90%)). In some embodiments, the Total Boride volume fraction can be ≥70% and <90% (or ≥about 70% and <about 90%). In some embodiments, the Total Boride volume fraction can be ≥75% and <85% (or ≥about 75% and <about 85%). In some embodiments, the Total Boride volume fraction can be ≥70% and <95% (or ≥about 70% and <about 95%).

Experimental Detail

The alloys described in Table 2 (P59-X19, P59-X27, P59-X25, and P59-X29) were welded using a lab scale bulk welding test. The goals of this test are to achieve an acceptably low percentage of unmelted particles, good weld quality, and substrate dilution in the range of 20-38%. Unmelted particles after welding may lead to reduced impact and abrasion resistance.

In some embodiments, the alloy can have less than or equal to 10 volume % (or about 10 volume %) unmelted particles. In some embodiments, the alloy can have less than or equal to 5% (or about 5%) unmelted particles.

Poor weld quality in the form of excessive flux sticking to the weld or porosity in the surface are indicative of conditions that would lead to production problems or low product quality respectively. Dilution must be within the specified range to: 1) ensure that good bonding with the substrate can be reliably achieved in production with excessively low dilution leading to poor bonding; 2) that the base material or substrate is not excessively weakened via thinning in the case of over dilution; and 3) that the weld and base material interface is relatively planar with excessive dilution leading to inconsistent overlay thickness across the bead and thus reduced wear performance of the coating.

In the case of the alloys described in the embodiments of this disclosure, P59-X25 and P59-X29, good weld quality was observed over the range of acceptable dilution with acceptable unmelts and weld quality observed as well. In the case of alloys outside the embodiments of this disclosure, P59-X19 and P59-X27, the only way to achieve good particle melting behavior and weld quality was to increase dilution to unacceptable levels.

The lab scale bulk welding process utilizes a machined mild steel substrate with a roughly rectangular cavity 6 inches by 1.25 inches at a depth of 6 mm. Said cavity is then filled with about 75 g of −250 micron powder blended to the ratios described in table 1. After ensuring the cavity is filled uniformly with powder, the powder is covered with granular welding flux. Above this is an automated welding torch is configured to oscillate at about 27 mm width and traverse at about 9 inches per minute with a contact tip to work distance of about 0.75 to 1.5 inches. Based on the experimental parameter of powder to wire ratio, the feed rate of a solid steel 5/64 inch wire is adjusted to so the ratio of wire to powder is correct after welding. Then the bulk welding proceeds, the flux removed, and the weld/coating deposit is examined for dilution, quality, and level of unmelts.

The P59-X19 wire was first welded at 2.5:1 powder to wire ratio as in Table 2. The result was too low dilution, excessive unmelts, and unacceptable flux to deposit adhesion. In the second test, the powder to wire ratio was reduced to 1.8:1 which yielded an acceptable dilution level but still had unacceptable level of unmelted particles and porosity. A further reduction to a powder to wire ratio of 1.2:1 yielded acceptable unmelt content and weld quality but unacceptable levels of dilution. In conclusion there is no acceptable intersection of the competing properties of unmelted particle content and acceptable dilution range. Similarly for P59-X27 the same result was observed with 1.2:1 yielding excessive dilution but 1.5:1 resulting in excessive unmelts despite proper dilution levels. These cases can be contrasted with P59-X29 and P59-X25 where both good dilution levels, good weld quality, and acceptable levels of unmelts were achieved concurrently.

TABLE 2

Experimental data for alloys inside (X25 and X29) and outside (X19 and X27) of the embodiments of this disclosure.

| Powder | Powder:Wire Ratio | Measured Dilution | Note |
| --- | --- | --- | --- |
| P59-X19 | 2.5 | 10% | Unmelted particles, flux sticks |
| P59-X19 | 1.8 | 32% | Unmelted particles and porosity |
| P59-X19 | 1.2 | 44% | Excessive Dilution |
| P59-X27 | 1.2 | 40% | Excessive Dilution |
| P59-X27 | 1.5 | 30% | Unmelted particles |
| P59-X25 | 1.3 | 38% | Marginal Dilution - Good weld |
| P59-X25 | 1.8 | 25% | Good Weld |
| P59-X29 | 1.9 | 22% | Good weld |
| P59-X29 | 2.2 | 28% | Good weld |

Performance

Wear resistant alloys are often described by their performance in laboratory testing. The disclosed tests correlate well with wear resistant components in service.

In some embodiments, the alloy hardness can be ≥55 HRC (or ≥about 55 HRC). In some embodiments the alloy hardness can be ≥58 HRC (or ≥about 58 HRC). In some embodiments, the alloy hardness is ≥60 HRC (or ≥about 60 HRC). In some embodiments the alloy hardness can be ≥62 HRC (or ≥about 62 HRC). In some embodiments, the alloy hardness can be ≥64 HRC (or ≥about 64 HRC). In some embodiments, the alloy hardness of less than 71 HRC (or less than about 71 HRC). In some embodiments, the alloy hardness of less than 65 HRC (or less than about 65 HRC).

In some embodiments the alloy has an ASTM G65 procedure A mass loss ≤0.2 g (or ≤about 0.2 g). In some embodiments the alloy has an ASTM G65 procedure A mass loss ≤0.16 g (or ≤about 0.16 g). In some embodiments the alloy has an ASTM G65 procedure A mass loss ≤0.12 g (or ≤about 0.12 g). In some embodiments the alloy has an ASTM G65 procedure A mass loss ≤0.1 g (or ≤about 0.1 g). In some embodiments the alloy has an ASTM G65 procedure A mass loss ≤0.08 g (or ≤about 0.08 g).

Welding and Performance

Alloys described in this disclosure may have improved toughness, impact, and wear resistance over conventional hardfacing materials.

Applications

The alloys described in this patent can be used in a variety of applications and industries. Some non-limiting examples of applications of use include:

Surface Mining applications include the following components and coatings for the following components: Wear resistant sleeves and/or wear resistant hardfacing for slurry pipelines, mud pump components including pump housing or impeller or hardfacing for mud pump components, ore feed chute components including chute blocks or hardfacing of chute blocks, separation screens including but not limited to rotary breaker screens, banana screens, and shaker screens, liners for autogenous grinding mills and semi-autogenous grinding mills, ground engaging tools and hardfacing for ground engaging tools, wear plate for buckets and dumptruck liners, heel blocks and hardfacing for heel blocks on mining shovels, grader blades and hardfacing for grader blades, stacker reclaimers, sizer crushers, general wear packages for mining components and other comminution components.

Downstream oil and gas applications include the following components and coatings for the following components: Downhole casing and downhole casing, drill pipe and coatings for drill pipe including hardbanding, mud management components, mud motors, fracking pump sleeves, fracking impellers, fracking blender pumps, stop collars, drill bits and drill bit components, directional drilling equipment and coatings for directional drilling equipment including stabilizers and centralizers, blow out preventers and coatings for blow out preventers and blow out preventer components including the shear rams, oil country tubular goods and coatings for oil country tubular goods.

Upstream oil and gas applications include the following components and coatings for the following components: Process vessels and coating for process vessels including steam generation equipment, amine vessels, distillation towers, cyclones, catalytic crackers, general refinery piping, corrosion under insulation protection, sulfur recovery units, convection hoods, sour stripper lines, scrubbers, hydrocarbon drums, and other refinery equipment and vessels.

Pulp and paper applications include the following components and coatings for the following components: Rolls used in paper machines including yankee dryers and other dryers, calendar rolls, machine rolls, press rolls, digesters, pulp mixers, pulpers, pumps, boilers, shredders, tissue machines, roll and bale handling machines, doctor blades, evaporators, pulp mills, head boxes, wire parts, press parts, M.G. cylinders, pope reels, winders, vacuum pumps, deflakers, and other pulp and paper equipment, Power generation applications include the following components and coatings for the following components: boiler tubes, precipitators, fireboxes, turbines, generators, cooling towers, condensers, chutes and troughs, augers, bag houses, ducts, ID fans, coal piping, and other power generation components.

Agriculture applications include the following components and coatings for the following components: chutes, base cutter blades, troughs, primary fan blades, secondary fan blades, augers, sugar cane harvesting, sugar cane milling operations, and other agricultural applications.

Construction applications include the following components and coatings for the following components: cement chutes, cement piping, bag houses, mixing equipment and other construction applications Machine element applications include the following components and coatings for the following components: Shaft journals, paper rolls, gear boxes, drive rollers, impellers, general reclamation and dimensional restoration applications and other machine element applications Steel applications include the following components and coatings for the following components: cold rolling mills, hot rolling mills, wire rod mills, galvanizing lines, continue pickling lines, continuous casting rolls and other steel mill rolls, and other steel applications.

The alloys described in this patent can be produced and or deposited in a variety of techniques effectively. Some non-limiting examples of processes include:

Thermal spray process including those using a wire feedstock such as twin wire arc, spray, high velocity arc spray, combustion spray and those using a powder feedstock such as high velocity oxygen fuel, high velocity air spray, plasma spray, detonation gun spray, and cold spray. Wire feedstock can be in the form of a metal core wire, solid wire, or flux core wire. Powder feedstock can be either a single homogenous alloy or a combination of multiple alloy powder which result in the desired chemistry when melted together.

Welding processes including those using a wire feedstock including but not limited to metal inert gas (MIG) welding, tungsten inert gas (TIG) welding, arc welding, submerged arc welding, open arc welding, bulk welding, laser cladding, and those using a powder feedstock including but not limited to laser cladding and plasma transferred arc welding. Wire feedstock can be in the form of a metal core wire, solid wire, or flux core wire. Powder feedstock can be either a single homogenous alloy or a combination of multiple alloy powder which result in the desired chemistry when melted together.

Casting processes including processes typical to producing cast iron including but not limited to sand casting, permanent mold casting, chill casting, investment casting, lost foam casting, die casting, centrifugal casting, glass casting, slip casting and process typical to producing wrought steel products including continuous casting processes.

Post processing techniques including but not limited to rolling, forging, surface treatments such as carburizing, nitriding, carbonitriding, boriding, heat treatments including but not limited to austenitizing, normalizing, annealing, stress relieving, tempering, aging, quenching, cryogenic treatments, flame hardening, induction hardening, differential hardening, case hardening, decarburization, machining, grinding, cold working, work hardening, and welding.

From the foregoing description, it will be appreciated that inventive products and approaches for powder feedstocks for wear resistant welding are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A bulk welding powder feedstock, the powder feedstock comprising Fe and, in wt. %:
   B: about 6.5 to about 9.5;
   C: about 0.5 to about 3;
   Cr: about 15 to about 25;
   Mo+W: about 15 to about 27.5; and
   Nb: about 1 to about 15;
   wherein the powder feedstock is formed from:
      about 20 to about 30 wt. % ferro boron,
      about 25 to about 40 wt. % ferro molybdenum,
      about 5 to about 15 wt. % ferro niobium,
      about 3 to about 8 wt. % boron carbide, and
      about 20 to about 35 wt. % ferro chromium.

2. The powder feedstock of claim 1, wherein the powder feedstock comprises, in wt. %, Fe: about 20 to about 60.

3. The powder feedstock of claim 1, wherein the powder feedstock comprises, in wt. %, Nb: about 3 to about 15.

4. The powder feedstock of claim 1, wherein the powder feedstock is configured to form an alloy comprising, under equilibrium thermodynamic conditions at 1300K, a total mole fraction of MC carbides of between about 1% and about 9%, wherein M is selected from the group consisting of Nb, Ti, Zr, V, Ta, W, Hf, and combinations thereof.

5. The powder feedstock of claim 4, wherein, under the equilibrium thermodynamic conditions at 1300K, the total mole fraction of MC carbides is between about 2% and about 8%.

6. The powder feedstock of claim 1, wherein the powder feedstock is configured to form an alloy comprising, under equilibrium thermodynamic conditions at 1300K, a total mole fraction of metallic matrix phases with a face-centered or body-centered cubic structure between about 5 and about 20%.

7. The powder feedstock of claim 1, wherein the powder feedstock is configured to form an alloy comprising, under equilibrium thermodynamic conditions at 1300K, a total boride mole fraction of between about 40 and about 90%.

8. The powder feedstock of claim 1, wherein the powder feedstock comprises, in wt. %, Fe and:
   B: about 8.07-about 9.07;
   C: about 0.94-about 1.34;
   Cr: about 20.73-about 22.73;
   Mo: about 21.84-about 23.84;
   Nb: 5.02-6.02; and
   Si: up to 1% silicon.

9. A method of bulk welding using the powder feedstock of claim 1, the method comprising:
   applying the powder feedstock to a substrate to form a weld.

* * * * *